Sept. 21, 1948.   H. R. BIRDSELL   2,449,539
NECKTIE SECURING DEVICE
Filed Feb. 16, 1945

INVENTOR
HARRY R. BIRDSELL
BY Hyde and Meyer
ATTORNEYS

Patented Sept. 21, 1948

2,449,539

UNITED STATES PATENT OFFICE 2,449,539

NECKTIE SECURING DEVICE

Harry R. Birdsell, Cleveland, Ohio

Application February 16, 1945, Serial No. 578,191

4 Claims. (Cl. 24—60)

This invention relates to securing or holding devices for neckties or the like.

The object of the invention is to provide an improved securing device which is easily applied and adjusted; which firmly holds the tie or other article in the desired position; which is durable and not likely to get out of order in service; and which may be made and sold at low cost.

Further objects of the invention in part are obvious and in part will appear more in detail hereinafter.

The tie securing device forming the subject matter of the present invention may be made of any material suitable for the purpose, such as wood, metal, plastic compositions, wire or the like, and according to the particular material employed may take a variety of forms, two of which are illustrated but with no thought of limitation beyond the scope of the claims appended hereto.

Figure 1:
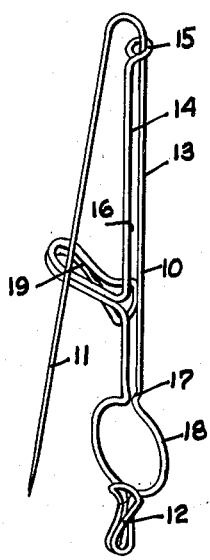
Fig. 1 represents a perspective view of one form of device embodying the invention.
Figure 2:
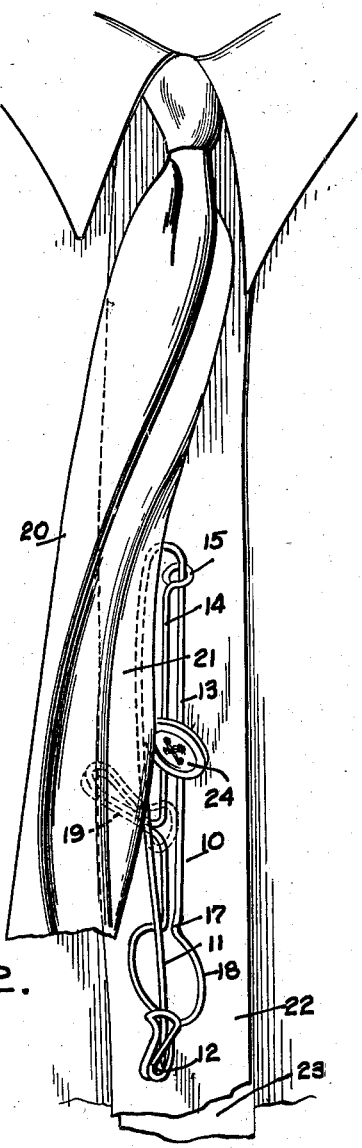
Fig. 2 is a similar view, showing the device in the position which it occupies when in use.

Figs. 1 and 2 show a tie securing device made of suitable strong wire, either spring or alloy steel, or spring bronze or other metal or alloy, and plated with nickel, silver, gold or the like as desired. In this arrangement the device is made of a single piece of wire, although that is not essential. It comprises a body part, marked generally 10, from one end of which extends the sharply pointed piercing tongue or prong 11, the point of which may be locked or secured under the guard hook 12, in the manner of an ordinary wire safety pin. This tongue parallels and lies quite close to the body part 10 when the tongue is closed and the device is in place on the wearer in front of the buttonhole strip of his shirt.

Body 10 consists of two parallel wire arms 13, 14, one of which, 13, is continuous with the tongue 11, and the other of which, 14, has its free end anchored permanently to the other in any suitable manner, as by an end loop 15 bent around the other, as shown. The two arms are slightly spaced from each other to provide a long narrow slot or recess 16 between them, closed at one end by the loop 15, where the base of tongue 11 joins the body, and at the other end by a gate 17 where the wires of the two arms extend inwardly toward and into close relation with each other. Beyond the gate the wire arms are bent outwardly into two semicircular portions, forming a generally circular eye 18, through which a shirt button may be passed, as will later appear. Beyond said eye the wires of the two arms lie parallel to each other and are bent to form the guard hook 12, before referred to. Either of the arms such as arm 14 in the form shown, may have its wire bent laterally into the form of a loop or hook the body of which lies in the general plane of the eye, and the reversely and backwardly extending free end portion of which lies on the opposite side of the body from the piercing tongue, thus providing a securing clamp hook 19, although this is not essential and may be omitted. This hook is adapted for engagement with the edge of the buttonhole strip of the skirt of the wearer, as will later appear.

In Fig. 2, the device is shown in the position which it occupies when in use for holding an ordinary four-in-hand tie having the usual exposed larger front end 20 which covers and conceals the smaller back end 21. This tie overlies the buttonhole and button strips 22, 23, of the shirt, to the latter of which the buttons 24 are secured by thread forming what may be termed a button shank.

In applying the device, the user, after knotting and suitably adjusting the tie, selects a particular shirt button most conveniently located for use as an anchor. He then fastens the securing device to the tie in the position shown in the drawings, passing the piercing tongue completely through the back end of the tie and through the back layers (but not the exposed front layer) of the front end of the tie. The shirt button is now passed through the eye 18, and the button is forced upwardly, causing its thread shank to pass through the gate 17 into the recess or slot 16. Enough pressure is necessary to spring the arms apart, the sense of feeling giving notice when the gate is actually passed. Now the button shank is in the slot, along which it may be adjusted to any suitable position where the tie lies snugly and flat on the chest, without noticeable bulge on account of the small bulk and thickness of the device. If the device includes a clamp hook 19, this may be hooked over the edge of the buttonhole strip, as additional securement.

Figure 3:
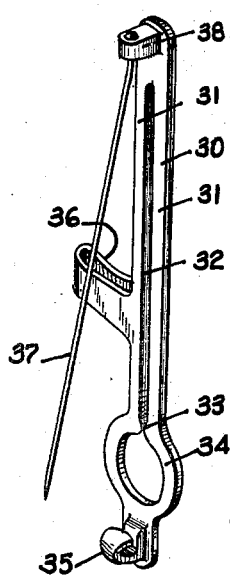
Fig. 3 is a view corresponding to Fig. 1, but showing another form of the invention.

In the arrangement shown in Fig. 3, the body 30 of the device is made of a thin, flat sheet of material, either metal or plastic composition, also of small bulk, slotted lengthwise between its edges to form the two parallel arms 31 separated by the slot 32 having a gate 33 and bowed laterally to provide the button receiving eye 34. One end of the body is shown bent to form the guard hook 35; and a clamp hook 36 is formed from a laterally projecting portion at one edge of one of the arms. The piercing tongue 37, in this form, is of spring or other strong steel and is mounted upon a bracket 38 secured to or forming part of the body, in the usual manner.

This device is used in the same manner before described.

All forms of the device are extremely simple and yet provide ample securement of the tie in the desired position, holding it flat and close to the wearer. At the same time the elongated slot provides a certain amount of vertical adjustment or self-accommodation of the tie to take care of body movements. When the device is secured in place as shown in Fig. 2, it lies close to the body, in front of the buttonhole strip of the shirt, and, since it is relatively thin or of small bulk, without noticeable bulge in or thickness of the tie. The device also is capable of being fashioned of ornamental materials, is pleasing in appearance, and is not likely to corrode or tarnish.

Other advantages of the invention will be apparent to those skilled in the art.

What I claim is:

1. A tie securing device, comprising an elongated body part having a piercing tongue which, when the device is in use, is secured to the upper end of the body part, and a guard and holder for the tongue point mounted on its lower end, said tongue when closed in the guard lying close to the body to reduce thickness and bulk, said body part being formed to provide two parallel arms spaced apart and adapted to embrace and to receive in the slot between them the shank of a shirt button, said arms being joined to close the slot at its upper ends and also having outwardly extending portions at their lower ends forming a button-receiving eye, the opening in which communicates with the lower end of said slot by way of a restricted gateway, whereby, when the device is secured to the rear face of a tie in closed and in vertical position with said eye at its lower end, a shirt button may be passed through said eye and through the restricted gateway to a position in said slot in which it is then releasably confined against escape through the closed upper end of said slot.

2. A tie securing device, comprising an elongated body part having a piercing tongue which, when the device is in use, is secured to the upper end of the body part, and a guard and holder for the tongue point mounted on its lower end, said tongue when closed in the guard lying close to the body to reduce thickness and bulk, said body part being formed to provide two parallel arms spaced apart and adapted to embrace and to receive in the slot between them the shank of a shirt button, said arms being joined to close the slot at their upper ends and also having outwardly extending portions at their lower ends forming a button-receiving eye, the opening in which communicates with the lower end of said slot by way of a restricted gateway, whereby, when the device is secured to the rear face of a tie in closed and in vertical position with said eye at its lower end, a shirt button may be passed through said eye and through the restricted gateway to a position in said slot in which it is then releasably confined against escape through the closed upper end of said slot, one of the arms of the body part between its ends being a lateral extension lying in the general plane of said eye and provided with a return portion lying on the opposite side of the body from said tongue and forming a hook adapted to embrace the edge of the shirt buttonhole strip to which the device is applied.

3. A tie securing device, made of wire shaped to form a piercing tongue having a point at one end and at its opposite end being connected by a bend of the wire to a body part lying close to and generally parallel to the piercing tongue when the device is closed and in use, and which body, at its opposite end is formed to provide a guard hook for the tongue, the wire of the body including two elongated parallel arms having portions secured together at the body end of said tongue and spaced apart to provide a slot and at their other ends extending toward each other to form a restricted gateway, beyond which the wire of the arms curves outwardly to form a button-receiving eye, whereby, when the device is secured to the rear face of the tie in closed and in vertical position with said eye at its lower end, a shirt button may be passed through said eye and restricted gateway to a position in said slot in which it is then releasably confined against escape through the closed upper end of the slot.

4. A tie securing device, made of wire piece to form a piercing tongue having a point at one end and at its opposite end being connected by a bend of the wire to a body part lying close to and generally parallel to the piercing tongue when the device is closed and in use, and which body, at its opposite end is formed to provide a guard hook for the tongue, the wire of the body including two elongated parallel arms having portions secured together at the body end of said tongue and spaced apart to provide a slot and at their other ends extending toward each other to form a restricted gateway, beyond which the wire of the arms curves outwardly to form a button-receiving eye, whereby, when the device is secured to the rear face of the tie in closed and in vertical position with said eye at its lower end, a shirt button may be passed through said eye and restricted gateway to a position in said slot in which it is then releasably confined against escape through the closed upper end of the slot, the wire of one of said arms also extending outwardly in the general plane of said eye and then back upon itself in the general plane of said eye to form a clamp hook adapted for engagement with the edge of the buttonhole strip.

HARRY R. BIRDSELL.

REFERENCES CITED

The following references are of record in the file of this patent:

UNITED STATES PATENTS

| Number | Name | Date |
|---|---|---|
| 239,858 | Selvage | Apr. 5, 1881 |
| 439,423 | Potts | Oct. 28, 1890 |
| 680,430 | Clarke | Aug. 13, 1901 |
| 795,267 | Burroughs | July 25, 1905 |
| 1,030,431 | Robinson | June 25, 1912 |
| 1,056,609 | Walton | Mar. 18, 1913 |

FOREIGN PATENTS

| Number | Country | Date |
|---|---|---|
| 103,526 | Great Britain | Feb. 1, 1916 |

Certificate of Correction

Patent No. 2,449,539. September 21, 1948.

HARRY R. BIRDSELL

It is hereby certified that errors appear in the printed specification of the above numbered patent requiring correction as follows:

Column 2, line 16, for the word "skirt" read *shirt*; column 3, line 38, for "its" read *their*;

and that the said Letters Patent should be read with these corrections therein that the same may conform to the record of the case in the Patent Office.

Signed and sealed this 4th day of January, A. D. 1949.

[SEAL]

THOMAS F. MURPHY,
*Assistant Commissioner of Patents.*